(12) United States Patent
Suryawanshi et al.

(10) Patent No.: US 11,727,304 B2
(45) Date of Patent: Aug. 15, 2023

(54) INTELLIGENT SERVICE TEST ENGINE

(71) Applicant: Bank of America Corporation, Charlotte, NC (US)

(72) Inventors: Neeraj Kumar Suryawanshi, Chandanagar Hyderabad (IN); Raja, Kondapur Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 672 days.

(21) Appl. No.: 16/739,042

(22) Filed: Jan. 9, 2020

(65) Prior Publication Data

US 2021/0216903 A1 Jul. 15, 2021

(51) Int. Cl.
*G06N 20/00* (2019.01)
*G06N 5/04* (2023.01)
*G06F 16/25* (2019.01)
*G06F 16/23* (2019.01)

(52) U.S. Cl.
CPC ......... *G06N 20/00* (2019.01); *G06F 16/2379* (2019.01); *G06F 16/252* (2019.01); *G06N 5/04* (2013.01)

(58) Field of Classification Search
CPC .. G06F 16/955; G06F 16/252; G06F 16/2379; G06N 5/04; G06N 20/00
USPC .......................................................... 706/11
See application file for complete search history.

(56) References Cited

U.S. PATENT DOCUMENTS

| | | |
|---|---|---|
| 7,028,223 B1 | 4/2006 | Kolawa et al. |
| 7,895,565 B1 | 2/2011 | Hudgons et al. |
| 9,032,361 B2 | 5/2015 | Dhalait |
| 9,519,477 B2 | 12/2016 | Champlin-Scharff et al. |
| 9,536,225 B2 | 1/2017 | Rallapalli et al. |
| 9,606,903 B2 | 3/2017 | Murugesan |
| 9,772,933 B1 | 9/2017 | Edrey et al. |
| 10,223,246 B2 | 3/2019 | Pasala et al. |
| 10,228,932 B2 | 3/2019 | Ozdemir et al. |
| 2015/0082277 A1* | 3/2015 | Champlin-Scharff ...... G06F 11/3664 717/120 |
| 2020/0034279 A1* | 1/2020 | Shivam ................ G06N 5/046 |
| 2020/0409780 A1* | 12/2020 | Balasubramanian ...... G06F 11/3065 |

* cited by examiner

*Primary Examiner* — Vincent F Boccio
(74) *Attorney, Agent, or Firm* — Banner & Witcoff, Ltd.

(57) ABSTRACT

An illustrative computing system for an intelligent web service verification and validation system processes base input to identify a web service for testing. The intelligent web service verification and validation system processes user defined functional inputs, expected outputs, and assertions with a machine learning engine to provide functional inputs, expected outputs, and assertions based on provided input. The intelligent web service verification and validation system generates a test case pattern, such as a minimally sized test case pattern for regression testing. The intelligent web service verification and validation system executes testing of the service based on the test case pattern and logs test data in a data repository. The intelligent web service verification and validation system analyzes validation and test information, including inputs, outputs, and assertions, using a machine learning algorithm to improve future input and test case generation and testing procedures for the web service.

19 Claims, 7 Drawing Sheets

INTELLIGENT SERVICE TEST ENGINE

BACKGROUND

Aspects of the disclosure relate to verification and validation of web services. One or more aspects of the disclosure relate to a test system containing a machine learning computing system providing automated functional verification of computing services.

User interaction with enterprise computing systems is often complex and may involve data exchange with multiple services that may be implemented over multiple computing networks and/or locations. When developing new functionality or improving existing functionality, current service verification and validation methods often require knowledge of the inputs required to test specific use cases and/or to perform regression testing. Such computing service validation lacks a mechanism to guide both developers and/or test users to create necessary system inputs that may be needed to validate a given test case. As such, a need has been recognized for an intelligent testing service capable of guided generation of testing inputs and/or of an input test pattern and testing of networked computing applications.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide effective, efficient, scalable, and convenient technical solutions that address and overcome the technical problems associated with accurately evaluating web services for authenticity and validity.

In some cases, a base input may be provided in the data setup. The base input may be used to identify the web method for testing. The user may define functional inputs, expected outputs, and assertions. In some cases, the system may provide functional inputs, expected outputs, and assertions based on user input or base input. In response, a test case pattern may be generated by the system. In some cases, the system may provide a minimally sized test case pattern for regression testing. The system may store the test case pattern data for future use. In response to test case generation, the system may execute the testing procedure. In some cases, the system may log test data in a separate repository. Validation and test information may be presented to the user. The validation and test information, including inputs, outputs, and assertions, may be accessed by the system for automatic learning purposes. Automatic learning by the system may be used for future input and test case generation. In some cases, automatic learning may be used to present information to the user.

These features, along with many others, are discussed in greater detail below.

BRIEF DESCRIPTION OF THE DRAWINGS

The present disclosure is illustrated by way of example and not limited in the accompanying figures in which like reference numerals indicated similar elements in which.

DETAILED DESCRIPTION

Figure 1:
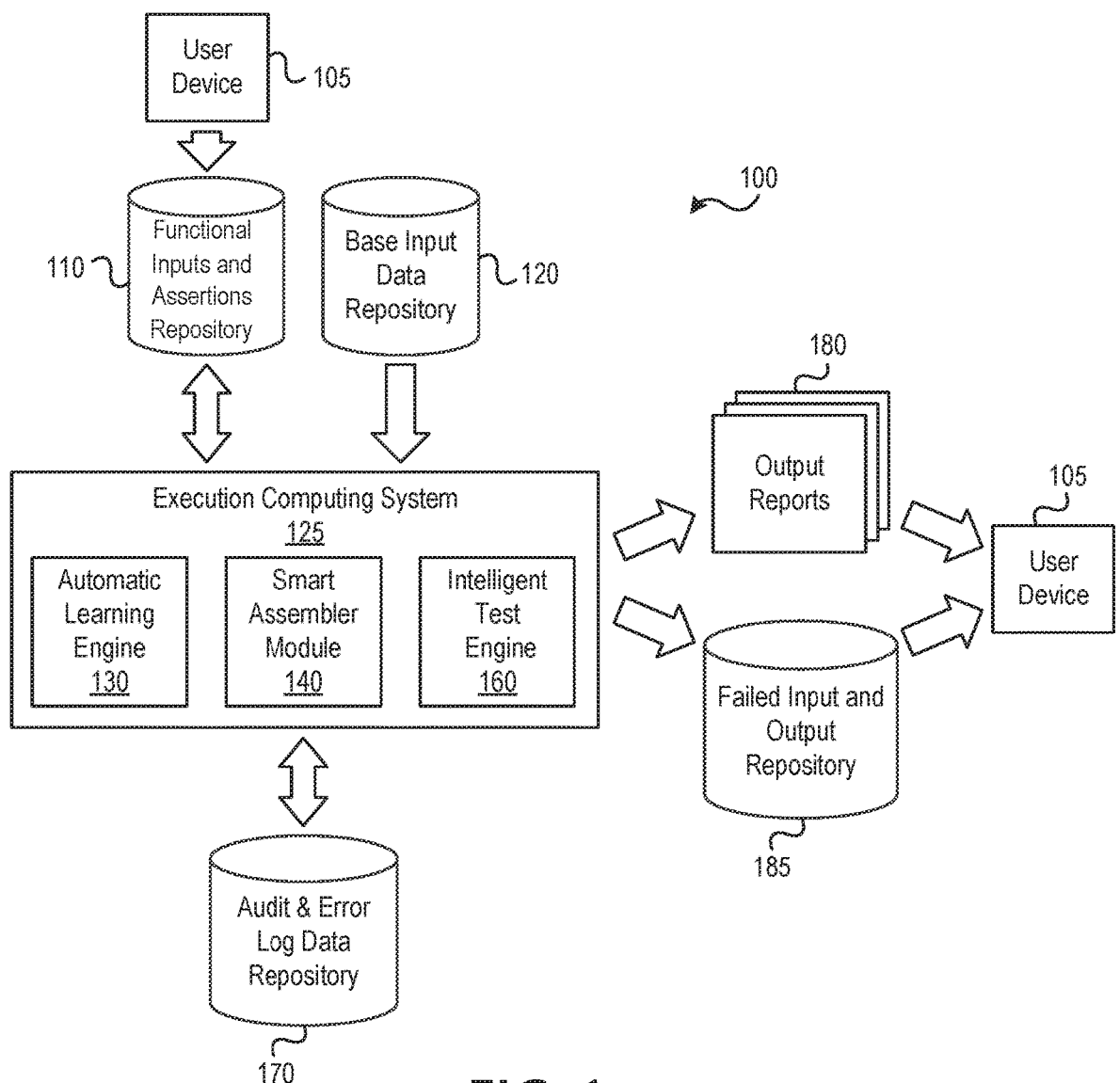
FIG. 1 depicts an illustrative computing environment for a web service verification and validation engine in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the present disclosure.

Aspects described herein are directed to developing a comprehensive service test engine that guides a user to validate the business functionality of a web service through automatic (e.g., machine) learning capability. Existing service test methods lack the ability to guide a user through functional verification of a given service. For example, no existing mechanism exists that can guide both functional users and/or technical users through a process to create the required inputs for any given test case. Further, existing systems and/or methods lack a comprehensive capability to learn from previous test iterations and fail to apply knowledge about test data that may be used as a guide for generating inputs for different test cases.

In some cases, a testing system may begin a service test procedure by generating a base input file based on automatically generated information corresponding to a networked computing service, where the input file may be provided to an intelligent service test engine. In some cases, the base input file may include an identification of one or more computing services and/or computing systems to be tested, such as by determining which ones of a plurality of computing systems are involved by use of a particular computing service (e.g., an active web service). In some cases, a user may define one or more functional inputs, expected outputs, and/or assertions (e.g., validation points). In some cases, the intelligent service test engine may generate functional inputs, expected outputs, and/or assertions based on a user input file, a base input file, and/or previous test data sets. Based on these inputs, one or more input test cases (e.g., a test case pattern file) may be generated by the intelligent service test engine. In some cases, the intelligent service test engine may generate minimally sized test case pattern file for use in a testing protocol, such as regression testing. Additionally, the intelligent service test engine may store the test case pattern data for future use, such as by a machine learning engine. In response to test case generation, the system may execute a testing procedure to validate a plurality of dynamic functions and/or validation scenarios associated with the tested computing service. In some cases, the intelligent service test engine may log test data in a separate data repository. Validation information and/or test information, which may include one or more system inputs, one or more system outputs, and/or one or more assertions, may be presented to the user, such as via a user display, a report, a message, or the like. Further, this validation information and/or test information may be accessed by the intelligent service test engine for automatic learning purposes such as by an automatic learning engine associated with the intelligent service test engine. In some cases, the intelligent service test engine may automatically process one or more machine learning algorithms to learn characteristics of a tested application, such that output of a machine-learning engine may be used to improve future input file generation, future test case generation, and/or the like. In some cases, an automated learning engine may process one or more machine learning algorithms to improve generation and/or formatting information to guide a user through building a test case for testing a networked service.

These and various other arrangements will be discussed more fully below.

FIG. 1 depicts an illustrative computing environment 100 for a web service verification and validation engine in accordance with one or more aspects described herein. For example, the computing environment 100 may include a first data store 110 (e.g., a database), that may store a plurality of functional inputs and assertions, a base input data store 120, an execution computing system 125 that may process instructions to provide one or more of an automatic learning engine 130, a smart assembler module 140, an intelligent test engine 160, and may store and/or access data in an audit and error log data repository 170. For example, the intelligent test engine 160 may store data corresponding to one or more output reports 180 and/or may populate data within a separate failed input and output data store 185. Although the user device 105 is defined as single functional user device in FIG. 1, multiple users may be communicatively coupled to the computing environment without departing from the present disclosure.

In some cases, the user device 105 may be associated with a technical user (e.g., a test engineer, a software developer, and the like) and may provide functional inputs and/or assertions to the functional inputs and assertions data store 110. In some cases, functional inputs and/or assertions may be stored in the functional inputs and assertions data store 110. Further, one or more components of the execution computing system 125 (e.g., the automatic learning engine 130, the smart assembler module 140, the intelligent test engine 160) may generate functional inputs and assertions that may be stored in the functional inputs and assertions data store 110.

In some cases, functional inputs and/or assertions stored in the data store 110 may be used to validate one or more services and/or applications based on a particular test case. In some cases, the user device 105 may provide incomplete functional inputs and/or assertions that may be used to validate at least a portion of a test case. In some cases, the incomplete functional inputs and/or assertions may include an indication of a particular computer service functionality to undergo service testing. In some cases, one or more of the user device 105, the automatic learning engine 130, the smart assembler module 140, the intelligent test engine 160 may add, remove, and/or modify the inputs in the functional inputs and assertions data store 110 at any time during service testing. In some cases, the functional inputs and assertions data store 110 may be configured at a central storage location or may be distributed over a number of different locations, where the functional inputs and assertions data store 110 may be used as a common location for all, or at least most, test input scenarios to be saved and accessed use by the computing environment 100.

In some cases, the base input data store 120 may contain information corresponding to a test of one or more services. For example, the base input data store 120 may contain at least one base input file comprising at least an identifier of a service (e.g., a uniform resource locator (URL)) and/or additional information (e.g., a matter name identifying application functionality) that defines the service to be tested. Information corresponding to a test of one or more services may preexist in the base input data store 120. This base input data store 120 may also be used by one or more computing components when verifying operation of a particular service URL and matter name before service testing begins. As mentioned above, the execution computing system 125 may include the automatic learning engine 130, the smart assembler module 140, and the intelligent test engine 160, and may receive the input and assertion data stored in the functional inputs and assertions data store 110 and service information stored in the base input data store 120 for use when executing the desired test case. In some cases, the smart assembler module 140 may edit the data contained in the base input data store 120 based on functional input and/or assertion data contained in the functional inputs and assertions data store 110.

The execution computing system 125 may receive data from sources including at least the functional inputs and assertions data store 110, the base input data store 120, and/or the audit and error log data repository 170. Based on input data received by the execution computing system 125, the smart assembler module 140 may process the input and assertion data to create an input for processing by the intelligent test engine 160. The smart assembler module 140 may understand the context and protocol related to the data it processes. In some cases, the smart assembler module 140 may process input data from the automatic learning engine 130 to create an input for processing by the intelligent test engine 160. In some cases, the smart assembler module 140 may execute a learning algorithm to create an input test case based on data contained in the functional inputs and assertions data store 110, the base input data store 120, and/or the audit and error log data repository 170. In some cases, the automatic learning engine 130 may enable the start of the execution computing system 125 based on previous test data from the audit and error log data repository 170. In some cases, the smart assembler module 140 may enable the start of the execution computing system 125 based on data contained in the functional inputs and assertions data store 110 and/or the base input data store 120. The intelligent test engine 160 may receive the input generated by the smart assembler module 140 and data from the functional inputs and assertions data store 110 and may respond by executing a service test of the functional inputs and assertions. The intelligent test engine 160 may log all/any test data. In some cases, the log data generated by the intelligent test engine 160 may be stored in the audit and error log data repository 170 for future access. In some cases, the data stored in the audit and error log data repository 170 may include logs, execution times, system performance metrics, and exceptions and faults arising due to test failures and failed assertions. Data from failed tests including input data, expected output data, and/or actual output data may be stored in a failed input and output data store 185. The occurrence of failed test cases within the intelligent test engine 160 may prompt a notification to the user device 105. The user device 105 notification of failed test cases within the intelligent test engine 160 may include an instant user help module to analyze test data. The instant user help module may present information to the user device 105 of the potential root cause of the failed test. The notification may contain data from the failed input and output data store 185 corresponding to a particular failed test. Upon completion of test execution within the intelligent test engine 160, a series of output reports 180 may be generated by the intelligent test engine 160. In some cases, the output reports 180 may contain input test data, expected output data, and/or actual output data. The output reports 180 may be available for user device 105 viewing. The user device 105 may enable automatic reporting of the output reports 180, user interface views of reporting data, and the like, to a user.

In some cases, upon the completion of an initial service test, the automatic learning engine 130 may read and analyze the data stored in the functional inputs and assertions data store 110, the audit and error log data repository 170, the output reports 180, and the failed input and output data store 185. In some cases, automatic learning by the automatic learning engine 130 may be performed using one or more machine learning algorithms and may be used for future input file generation, test case generation, and/or the like. In some cases, the automatic learning engine 130 may guide a user through generation of inputs for service testing based on the user-desired test case and the user provided input. In some cases, the automatic learning engine 130 may query the user device 105 for a particular case to be tested and may prompt the smart assembler module 140 to generate the inputs and assertions that correspond to the user response. The automatic learning engine 130 may be trained by repeated analysis of test data and may automatically improve over test iterations. In some cases, the automatic learning engine 130 may continuously audit the execution computing system 125. During auditing, in some cases, the automatic learning engine 130 may modify data and procedures within the smart assembler module 140 to improve service testing. In some cases, the automatic learning engine 130 can provide the minimum number of inputs for a testing protocol (e.g., regression test) where the user only wishes to validate certain test cases. In some cases, the automatic learning engine 130 will generate inputs for a testing protocol (e.g., regression testing) based on a user provided function for testing and/or previous test scenario data relating to a user provided function for testing.

Figure 2A:
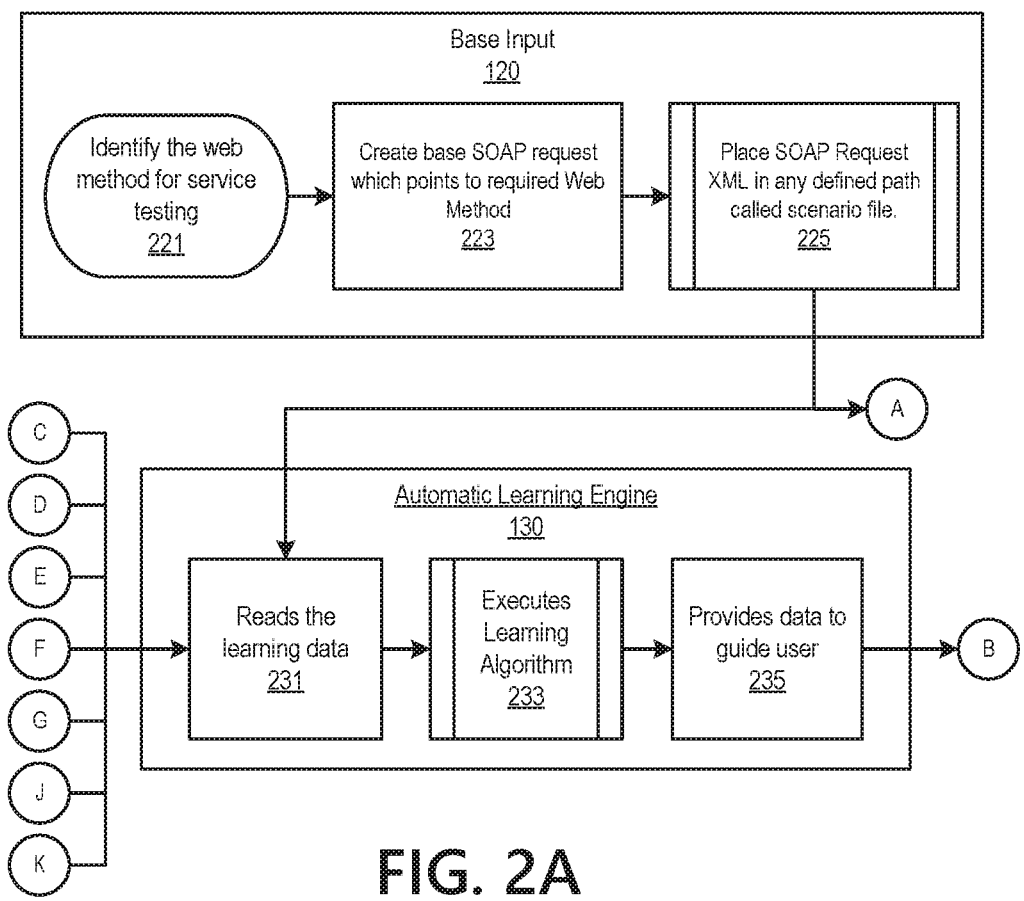
FIG. 2A-2D depicts an illustrative event sequence for an intelligent web service verification and validation engine in accordance with one or more aspects described herein.
Figure 2B:
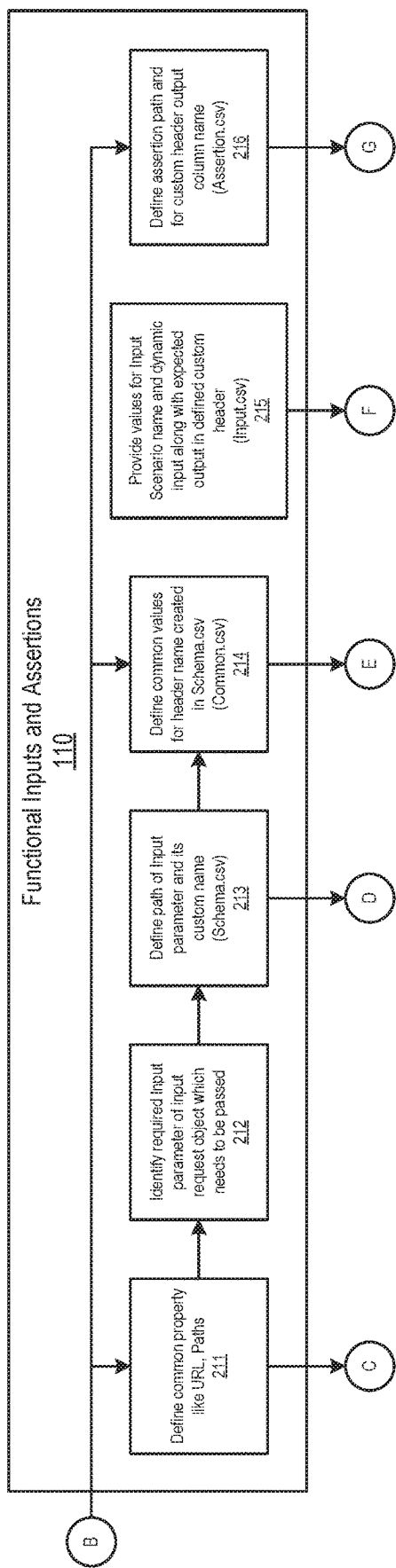
Figure 2C:
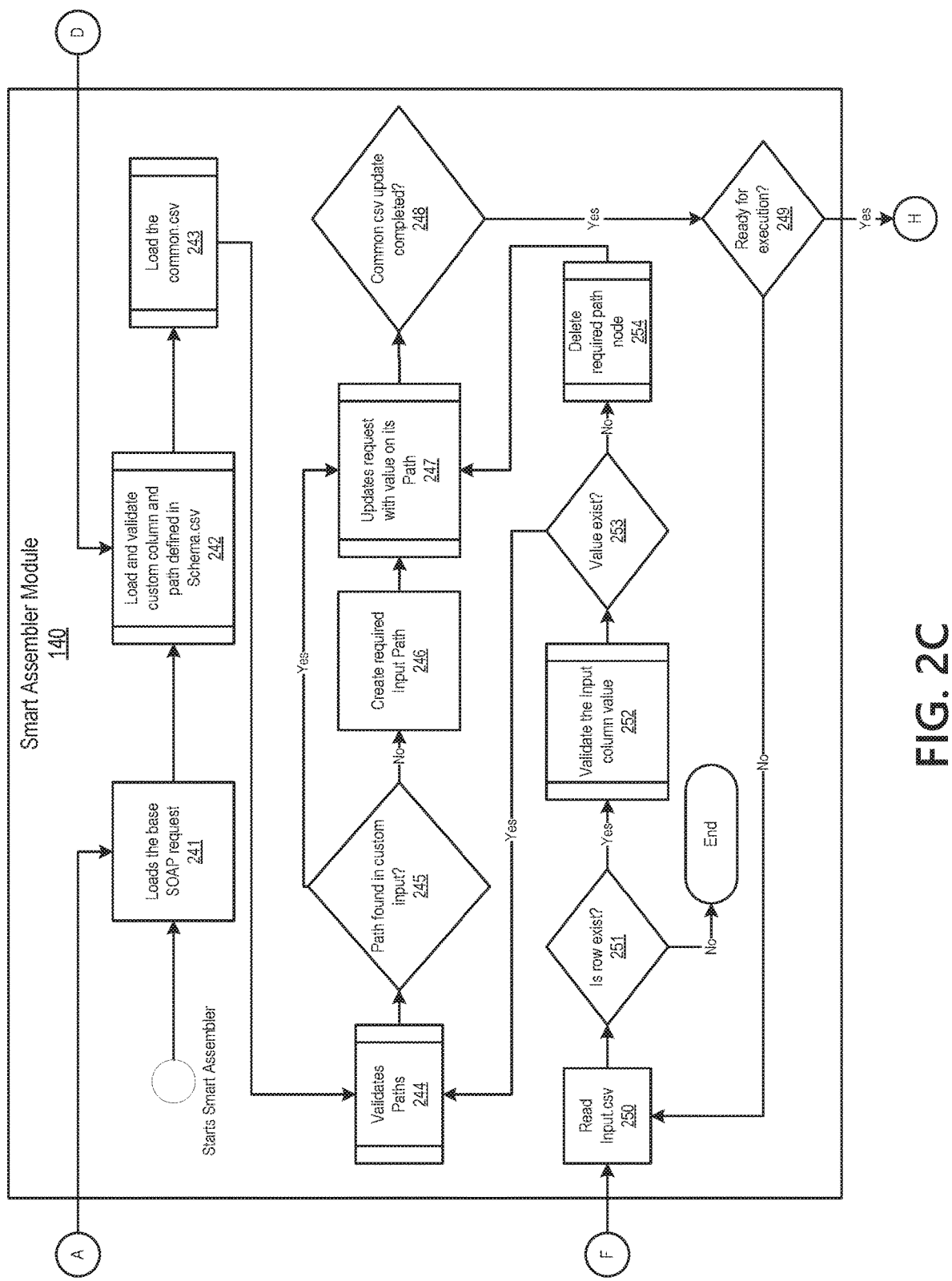
Figure 2D:
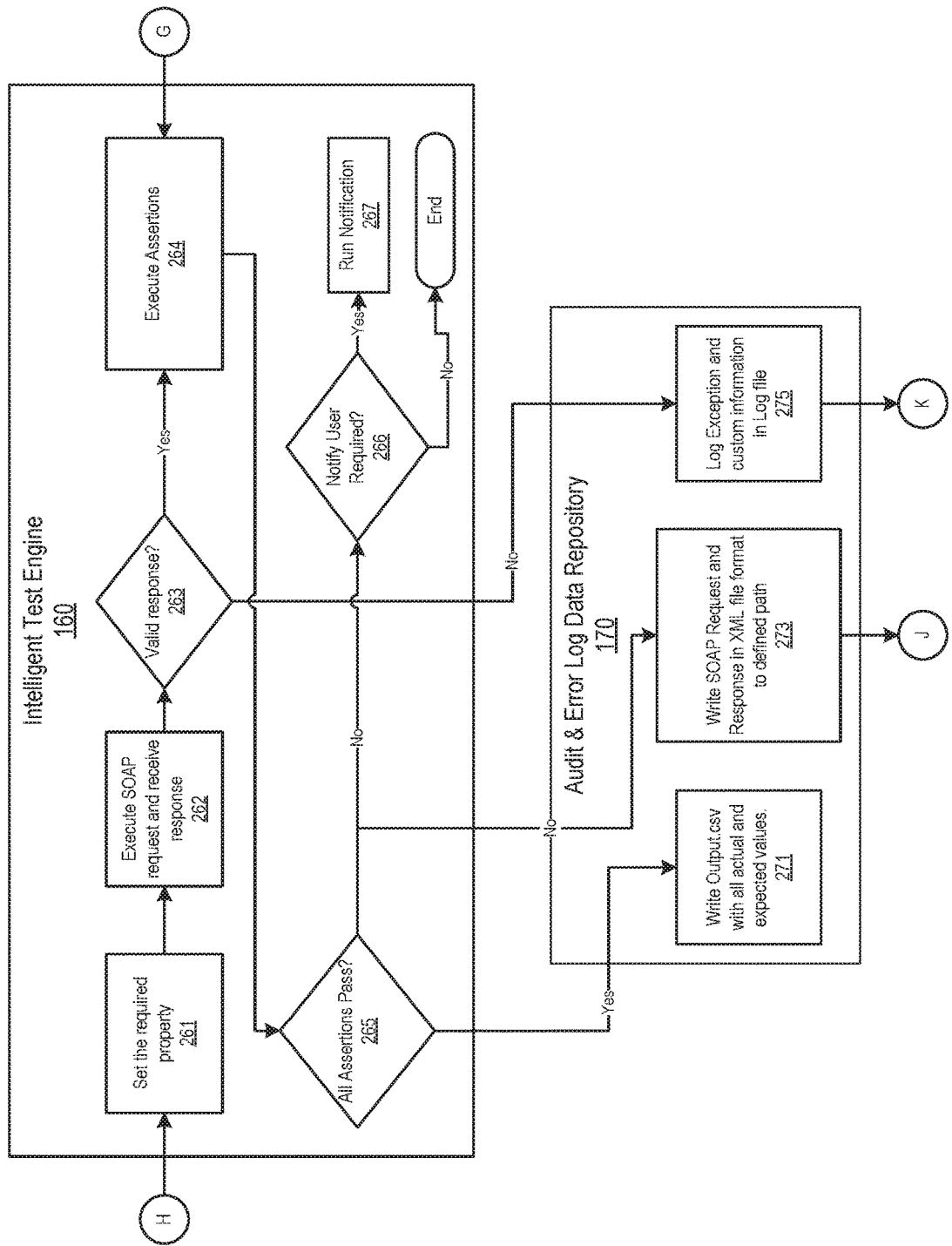

FIG. 2A-2D show an illustrative event sequence for web service verification by a validation engine in accordance with one or more aspects described herein. The events shown in the illustrative event sequence are merely one illustrative sequence and additional events may be added, or events may be omitted, without departing from the disclosure. Inputs and outputs represented illustrative sequence may be associated with sources and destinations not depicted in the figures. Referring to FIG. 2A, the illustrative event sequence may include data access from a data store, such as the base simple object access protocol (SOAP) extensible markup language (XML) input data store 120, which may be processed by the automatic learning engine 130. Referring to FIG. 2B, the illustrative event sequence may be processed by elements of FIG. 1 and may store data in a data store, such as the functional inputs and assertions data store 110. Referring to FIG. 2C, the illustrative event sequence may be processed by elements of FIG. 1, including the smart assembler module 140. Referring to FIG. 2D, the illustrative event sequence may be processed by elements of FIG. 1, such as the intelligent test engine 160 and may process and/or store data in one or more data stores, such as the audit and error log data repository 170. The illustrative event sequence of FIG. 2A-2D may be an interconnected event sequence with inputs and outputs of different steps in the event sequence coming from any of FIG. 2A-2D.

Referring to FIG. 2A, at 221, the execution computing system 125 may access the base SOAP XML input data store 120 to identify the web method for testing. For example, the execution computing system 125 may access an input file corresponding to a web service, which may include one or more service identifiers (e.g., a uniform resource locator (URL)), additional information (e.g., a matter name identifying application functionality, and the like). At 223, the execution computing system 125 may further access the base SOAP XML input data store 120 to access a file comprising an identifier associated with a base SOAP request and storing a service identifier pointing to a web-based service desired to be service testing. At 225, the execution computing system 125 may process the SOAP request and may store the SOAP request XML file with respect to a defined path, such as saving the SOAP request XML as a scenario file, and which may be made available for use for at least the automatic learning engine 130 and/or smart assembler module 140 of the execution computing system 125. The automatic learning engine 130, at 231, may read the scenario file containing the SOAP request XML file as a component of learning data, where learning data may be processed via one or more machine learning algorithms (e.g., a linear regression algorithm, a logistic regression algorithm, a ridge regression algorithm, a classification and regression tree algorithm, a conditional decision tree algorithm, a Bayesian algorithm, and the like). The learning data may come from a variety of sources within the overall system to be mentioned in subsequent figures. For example, the automatic learning engine 130 may read and/or gather data from one or more sources, such as the functional inputs and assertions data store 110 and the audit and error log data repository 170, user defined inputs, and the like. Such data may include pointers to web-based or network based services to be tested and/or utilized in testing (e.g., a URL, a network path, and the like), an input parameter file, a header file, a common value file, an assertion file, a test output file (e.g., a file comprising results of a SOAP request and the like), a test exception file and/or the like. This learning data may be used by the automatic learning engine 130 to when automatically generating one or more service test file iterations and may improve the quality and quantity of user input guide capabilities. In some cases, the learning data may be actively used by the automatic learning engine 130 to audit and modify the operation of elements within the execution computing system 125.

Upon reading the learning data, the automatic learning engine 130 may process this data via one or more machine learning algorithms at 233. Such machine learning algorithms may include one or machine learning capabilities to model a relationship between variables such as by iteratively refining variable relationships based on error analysis between predicted results and actual results from testing. In some cases, the automatic learning engine 130 may perform various techniques and automatically analyze data properties to generate the input test cases as needed for performing a particular test of a web-based or network-based service.

The machine learning algorithm may be used by the automatic learning engine 130 when generating the information to present at a user interface of the user device 105 to facilitate creation of custom inputs and assertions for testing and validation of a particular test case. For example, at 233, the automatic learning engine 130 may cause one or more user interface screens to be presented via the user device 105 at 235. In some cases, the user interface screens may include a user guide to provide an adaptive input interface that may allow creation of custom test data, which may be made available for use during testing and may be stored in at least the functional inputs and assertions data store 110. In an illustrative example, the data provided may contain information defining appropriate inputs and assertions and/or may provide expected outputs based on a given, or selected, test case. The data may be modified in real time by one or more elements of the execution computing system 125, such as by using results of a machine learning analysis of a previous test. For example, the automatic learning engine 130 may process a regression based machine learning algorithm of successive iterations of a regression test, and automatically update the learning data with results of the automatic analysis of testing results. In some cases, the automatic learning engine 130 may query the user device 105 to select or otherwise define a test case to use during service testing. The data may be capable of automatically populating the inputs of a particular test case. The automatic learning engine 130 may be configured to provide minimally sized test data for a particular testing protocol (e.g., regression testing).

FIG. 2B shows illustrative creation of functional inputs and assertions for use by the automatic learning engine 130. For example, the functional inputs and assertions data store 110 may store information corresponding to common properties for in testing web-based and network based-services including a URL and/or network path. Within the functional inputs and assertion data store 110, at 212, the automatic learning engine 130 may process a common service property (e.g., a URL, a network path) to identify one or more input parameters (e.g., required parameters, optional parameters, constants, and the like) of an input request object that needs to be passed to the service during testing and may store the one or more input parameters to the functional input and assertions data store 110. At 213, the automatic learning engine 130 may process such information to define the path and/or a custom name for the input parameter set, which may be made available for additional processing by at least the automatic learning engine 130 and/or the smart assembler module 140. In an illustrative example, the path and custom name for the input parameter may be saved in a comma-separated value (.CSV) file. At 214, the automatic learning engine 130 may process the path and/or custom names to identify common values for header names for use in one or more test cases, which may be made available for use for at least the automatic learning engine 130. In some cases, the common values for header names may be saved in a .CSV file or other file format. At 215, the automatic learning engine 130 may process information stored in the functional inputs and assertions data store 110 to provide values defining one or more input scenario names, corresponding dynamic inputs and/or expected outputs in a defined custom header, which may be made available for use for at least the automatic learning engine 130 and/or smart assembler module 140. Such input scenarios may be provided as a .CSV file or in an alternative file format. At 216, the automatic learning engine 130 may process information in the functional inputs and assertions data store 110 to define the assertion paths for a custom output header column name, which may be made available for use for at least the automatic learning engine 130 and/or the intelligent test engine 160. In some cases, assertion paths may be saved in a .CSV file or other file format. Additionally, in some cases, the automatic learning engine 130 may process inputs received from a user through interaction with one or more automatically generated user guide interface screens and process such inputs when defining one or more of a common property (e.g., a service name or path), a common header value for testing, and/or assertion header values for use in generating a test case, such as by the smart assembler module 140.

FIG. 2C shows a flow diagram illustrating a flow diagram for assembling an illustrative test case, such as by the smart assembler module 140. For example, at 241, the smart assembler module 140 may load a base SOAP request data file from the base SOAP)ML input data store 120. At 242, the smart assembler module 140 may filter input data based on an input parameter file and a header name file that may be read as part of a validation process for the custom column and path data defined from the functional inputs and assertions data store 110. At 243, the smart assembler file may load a file comprising common values for header names created by the automatic learning engine 130. At 244, the smart assembler module 140 may validate paths on the output data. At 245, if a path is not found in the custom input file, the required input path may be created at 246. If, at 244, a path is found, the smart assembler module 140 may request an update of a value on each path within the data. In some cases, the smart assembler module 140 may wait until the input file update is complete. If, at 248, the smart assembler module 140 determines the updates are complete, the smart assembler module 140 may determine, at 249, whether the input file is ready to be passed to the intelligent test engine 160 for further execution.

If the input data is ready for execution, the intelligent test engine 160 may communicate the test case information to the intelligent test engine 160. If not ready for execution, the smart assembler module 140 may further validate the inputs based on information accessed from the functional inputs and assertions data store 110, including data values for input scenario names, the corresponding dynamic inputs, and/or expected outputs with corresponding defined custom headers. At 251, the smart assembler module 140 may verify the data such as by determining the existence of rows in the input file, where each row may correspond to a step in the testing process. If the smart assembler module 140 verifies no rows exist in the data, the smart assembler module 140 may terminate the build of the test case. If the smart assembler module 140 verifies the existence of rows in the data, at 252, the smart assembler module 140 may validate the input column value in the file. At 253, the smart assembler module 140 may determine whether a value exists. If not, the path node (e.g., column) may be deleted at 254, and the smart assembler module 140 may send an update request with a value associated with a corresponding path at 247. If, at 253, a value does exist the smart assembler module 140 may continue with validating paths within the file at 244.

FIG. 2D shows an illustrative event sequence of instructions processed by the intelligent test engine 160 according to aspects of this disclosure. At 261, the intelligent test engine 160 may read a test case or test pattern output by the smart assembler module 140. For example, the intelligent test engine 160 may parse the test case file to identify and/or set a required property for processing one or more assertions. At 262, the intelligent test engine 160 may execute a SOAP request from the test case, such as by sending a request to the service under test and receiving a response. In some cases, the intelligent test engine 160 may validate the received response. If the intelligent test engine 160 determines that the response is not valid, at 263, the resulting data may be stored in the audit and error log data repository 170 at 275. For example, the intelligent test engine 160 may log the exception encountered during the service test along with the information corresponding to the failed request, in the audit and error log data repository 170 in a log file corresponding to the tested service. If the intelligent test engine 160 determines that a response is valid, testing of assertions associated with the test case or test pattern may continue at 264. At 265, the intelligent test engine 160 may determine whether all assertions associated with the test case or test pattern have passed. If so, at 265 the intelligent test engine 160 may store test results in one or more data repositories, such as the audit and error log data repository 170. For example, the intelligent test engine 160 may store an output file containing all actual test result values, expected output values of the service test, the tested input values, tested assertion information, and the like. If any of the assertions do not pass, at 266, the intelligent test engine 160 may determine whether user notification is required in response to the failure of some assertions to pass (e.g., checking a flag). If so, the intelligent test engine 160 may communicate a user notification of the assertion failure, such as by a visual indication, an audio indication, a notification message, a notification report and/or the like. Additionally, for any failed assertions, the intelligent test engine 160 may store, in a data repository (e.g., the audit and error log data repository 170), the corresponding failed SOAP request and response from the service test case or text pattern in a defined file format (e.g., XML, file format) and to a defined path within the audit and error log data repository 170 such that the smart assembler module 140 and/or the automatic learning engine 130 may process such information with a machine learning algorithm to improve input creation and/or creation of the test cases and test patterns.

Figure 3:
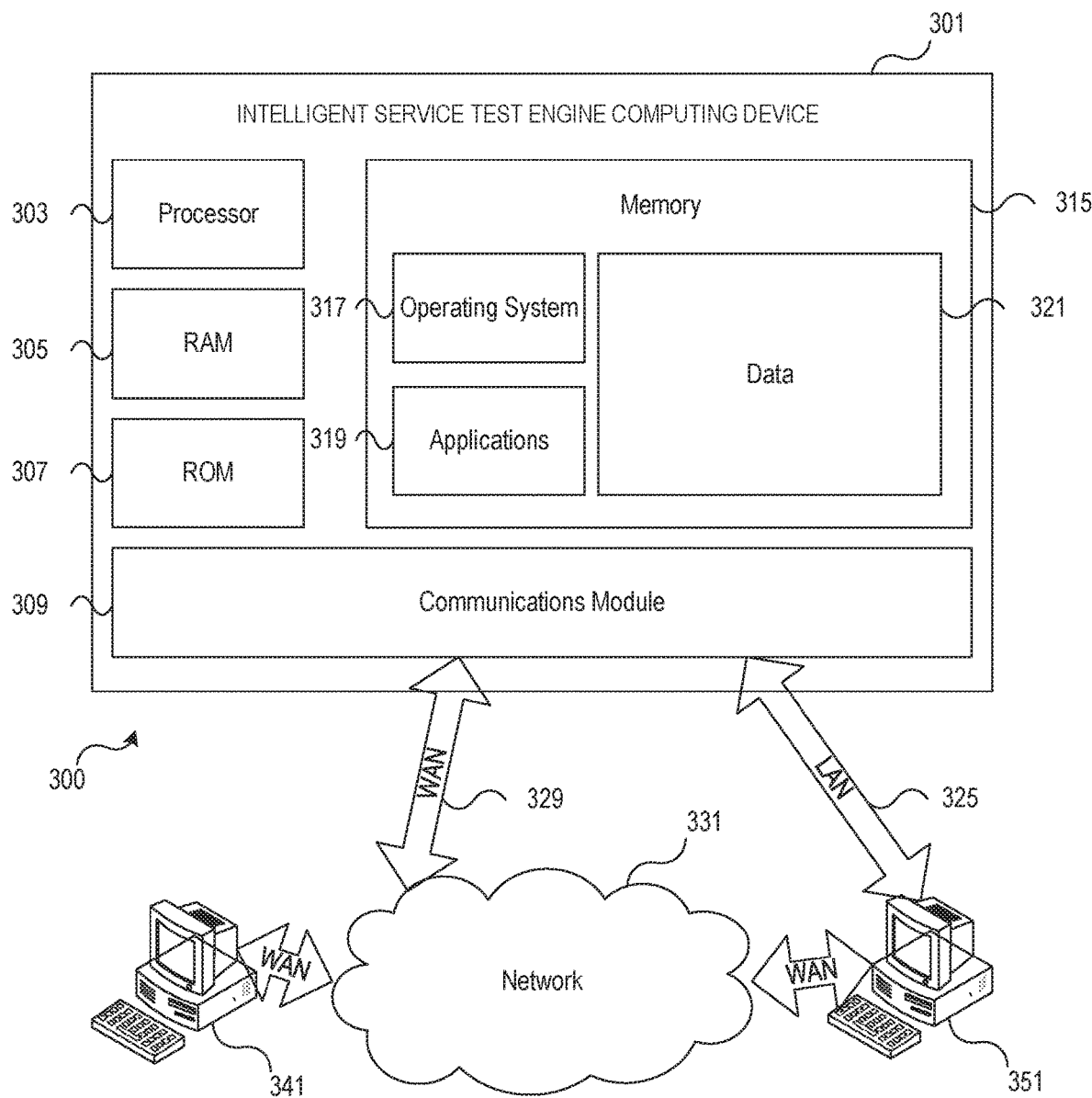
FIG. 3 illustrates one example operating environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative intelligent service test engine computing device 301 having a processor 303 for controlling overall operation of the intelligent service test engine computing device 301 and its associated components, including a Random Access Memory (RAM) 305, a Read-Only Memory (ROM) 307, a communications module 309, and a memory 315. The intelligent service test engine computing device 301 may include a variety of computer readable media. Computer readable media may be any available media that may be accessed by the intelligent service test engine computing device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the intelligent service test engine computing device 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the intelligent service test engine computing device 301. Such a processor may execute computer-executable instructions stored on a computer-readable medium.

Software may be stored within the memory 315 and/or other digital storage to provide instructions to the processor 303 for enabling the intelligent service test engine computing device 301 to perform various functions as discussed herein. For example, the memory 315 may store software used by the intelligent service test engine computing device 301, such as an operating system 317, one or more application programs 319, and/or an associated database 321. In addition, some or all of the computer executable instructions for the intelligent service test engine computing device 301 may be embodied in hardware or firmware. Although not shown, the RAM 305 may include one or more applications representing the application data stored in the RAM 305 while the intelligent service test engine computing device 301 is on and corresponding software applications (e.g., software tasks) are running on the intelligent service test engine computing device 301.

The communications module 309 may include a microphone, a keypad, a touch screen, and/or a stylus through which a user of the intelligent service test engine computing device 301 may provide input, and may include one or more of a speaker for providing audio output and a video display device for providing textual, audiovisual and/or graphical output. The computing system environment 300 may also include optical scanners (not shown).

The intelligent service test engine computing device 301 may operate in a networked environment supporting connections to one or more remote computing devices, such as the computing devices 341 and 351. The computing devices 341 and 351 may be personal computing devices or servers that include any or all of the elements described above relative to the intelligent service test engine computing device 301.

The network connections depicted in FIG. 3 may include a Local Area Network (LAN) 325 and/or a Wide Area Network (WAN) 329, as well as other networks. When used in a LAN networking environment, the intelligent service test engine computing device 301 may be connected to the LAN 325 through a network interface or adapter in the communications module 309. When used in a WAN networking environment, the intelligent service test engine computing device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
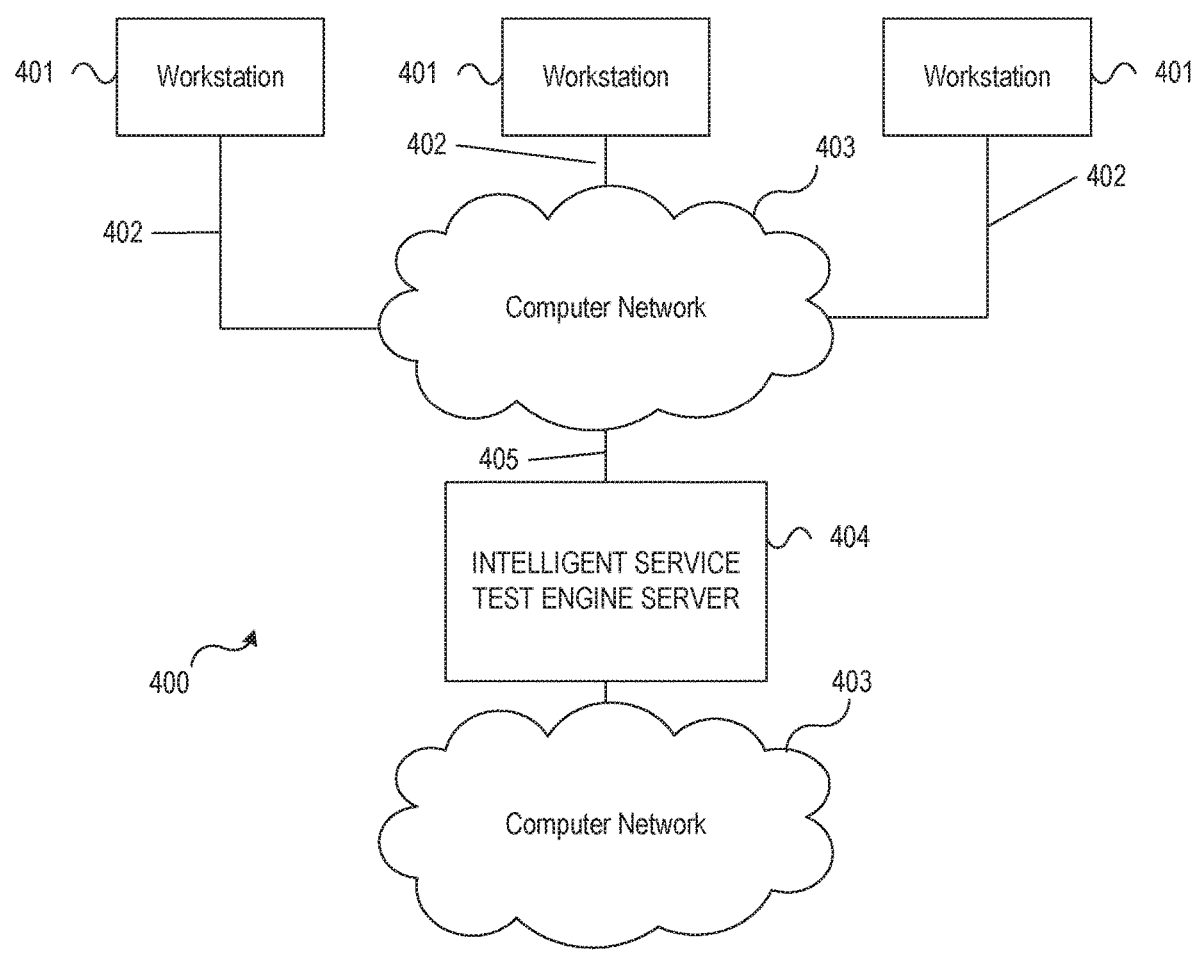
FIG. 4 depicts an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstations 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the intelligent service test engine server 404. In the system 400, the intelligent service test engine server 404 may be a server, processor, computer, or data processing device, or combination of the same, configured to perform the functions and/or processes described herein. The intelligent service test engine server 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the intelligent service test engine server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:
   at least one processor;
   a communication interface communicatively coupled to the at least one processor; and
   memory storing computer-readable instructions that, when executed by the at least one processor, cause the computing platform to:
      generate input test data comprising automatic learning engine suggested input and a number of regression test cases based on a specified networked service to be tested, wherein the input test data comprises values defining one or more input scenario names, corresponding dynamic inputs and expected outputs in a defined custom header and wherein inputs are minimized based on a selected set of test cases;
      generate, by a smart assembler module, a minimally sized test execution pattern from the input test data based on validation of paths within the input test data;
      execute, by an intelligent test engine, functional testing of a networked service application by a regression based machine learning algorithm using the number of regression test cases and the test execution pattern;
      log functional test data, from the intelligent test engine during functional testing of the networked service application, in a data repository;
      cause display, at a user device, of a comparison of expected output data and actual output data and based on the functional test data in the data repository; and
      process, by the automatic learning engine, the functional test data, results from the functional testing, and the number of regression test cases; and
      generate, by the automatic learning engine, an update to a data store comprising suggested input for the number of regression test cases.

2. The computing platform of claim 1, wherein the instructions, when executed by the one or more processors, cause the computing platform to:
   cause display, by the automatic learning engine, of a user interface screen for input of a desired test case.

3. The computing platform of claim 2, wherein the desired test case comprises filtered inputs and assertions.

4. The computing platform of claim 1, wherein the functional test data includes failed test cases and associated input data and a comparison of expected output data to actual output data.

5. The computing platform of claim 4, wherein the instructions, when executed by the one or more processors, cause the computing platform to:
   send, via a network interface, a user notification message to the user device based on an occurrence of a failed test case, wherein the user notification message includes an analysis of functional test data.

6. The computing platform of claim 1, wherein the instructions, when executed by the one or more processors, cause the computing platform to:
   update, by the automatic learning engine, a suggested input pattern based on an analysis of the functional test data stored in an audit and error log data repository.

7. A method, comprising:
   generating, by an automatic learning engine, an input test pattern comprising a combination of custom user defined input and automatic learning engine suggested input, wherein the input test pattern comprises input test data comprises values defining one or more input scenario names, corresponding dynamic inputs and expected outputs in a defined custom header;
   generating, by a smart assembler module, a test execution pattern from the input test pattern, wherein the test execution pattern comprises a plurality of regression test cases;
   initiating, by an intelligent test engine, functional testing of a networked service application by a regression based machine learning algorithm using the plurality of regression test cases using the input test pattern and the test execution pattern;
   logging functional test data, by the intelligent test engine during functional testing of the networked service application, in a data repository;
   causing display, at a user device, of a comparison of expected output data and actual output data and based on the functional test data in the data repository; and
   processing, by the automatic learning engine, the functional test data, results from the functional testing, and the test execution pattern; and
   generating, by the automatic learning engine, an update to a data store comprising suggested input for the test execution pattern.

8. The method of claim 7, further comprising:
   presenting, via a user interface of a user device by the automatic learning engine, one or more user interface screens to guide the user through preparation of a desired test execution pattern.

9. The method of claim 7, wherein processing, by the automatic learning engine, the functional test data, results from the functional testing, and the test execution pattern comprises:
   analyzing an audit log repository and output report data; and
   generating, via a machine learning algorithm and based on a comparison of historical input test patterns to current analyzed testing results, updated input to be suggested by the automatic learning engine.

10. The method of claim 8, comprising:
    generating, by the smart assembler module, a number of regression test cases based on the input test pattern and a specified testing protocol.

11. The method of claim 7, wherein the functional test data includes failed test cases, associated input data and a comparison of expected output data to actual output data.

12. The method of claim 11, comprising:
    sending, via a network interface, a user notification message to the user device based on an occurrence of a failed test case, wherein the user notification message includes an analysis of functional test data.

13. The method of claim 7, comprising:
    updating, by the automatic learning engine, a suggested input pattern based on an analysis of the functional test data in an audit and error log data repository.

14. One or more non-transitory computer-readable media storing instructions that, when executed by a computing platform comprising at least one processor, memory, and a communication interface, cause the computing platform to:
    generate input test data comprising automatic learning engine suggested input and a number of regression test cases based on a specified networked service to be tested, wherein the input test data comprises values defining one or more input scenario names, corresponding dynamic inputs and expected outputs in a defined custom header;

generate, by a smart assembler module, a test execution pattern from the input test data;

execute, by an intelligent test engine, functional testing of a networked service application by a regression based machine learning algorithm using the number of regression test cases and the test execution pattern to validate at least one regression test case;

log functional test data, from the intelligent test engine during functional testing of the networked service application, in a data repository;

cause display, at a user device, of a comparison of expected output data and actual output data and based on the functional test data in the data repository; and process, by the automatic learning engine, the functional test data, results from the functional testing, and the number of regression test cases; and generate, by the automatic learning engine, an update to a data store comprising suggested input for the number of regression test cases.

15. The one or more non-transitory computer-readable media of claim 14, wherein the instructions, when executed by the one or more processors, cause the computing platform to:

cause display, by the automatic learning engine, of a user interface screen for input of a desired test case.

16. The one or more non-transitory computer-readable media of claim 15, wherein the instructions, when executed by the one or more processors, cause the computing platform to:

generate, by the automatic learning engine, the test case based on filtered inputs and assertions.

17. The computing platform of claim 15, wherein the instructions, when executed by the one or more processors, cause the computing platform to:

analyze an audit log repository and output report data; and generate, via a machine learning algorithm and based on a comparison of historical input test patterns to current analyzed testing results, updated input to be suggested by the automatic learning engine.

18. The one or more non-transitory computer-readable media of claim 14, wherein the functional test data includes information corresponding to failed test cases.

19. The one or more non-transitory computer readable media of claim 14, wherein the instructions, when executed by the one or more processors, cause the computing platform to:

update, by the automatic learning engine processing a machine learning algorithm, a suggested input pattern based on automatic processing of the functional test data stored in an audit and error log data repository.

* * * * *